United States Patent
Avadhanam

(10) Patent No.: US 8,620,349 B2
(45) Date of Patent: Dec. 31, 2013

(54) MOBILE COMMUNICATION DEVICE WITH IMPROVED NETWORK CONNECTIVITY

(75) Inventor: Phani Bhushan Avadhanam, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 0 days.

(21) Appl. No.: 13/372,038

(22) Filed: Feb. 13, 2012

(65) Prior Publication Data
US 2013/0210407 A1    Aug. 15, 2013

(51) Int. Cl.
*H04W 88/02*    (2009.01)

(52) U.S. Cl.
USPC ...................................... 455/456.1

(58) Field of Classification Search
USPC ............. 455/456.3, 418, 41.1, 66.1, 566; 704/226; 702/19; 340/10.33, 584; 345/207; 250/338.1
See application file for complete search history.

(56) References Cited

U.S. PATENT DOCUMENTS

| | | | |
|---|---|---|---|
| 2001/0032059 A1* | 10/2001 | Kelly et al. | 702/150 |
| 2004/0010390 A1* | 1/2004 | Kelly et al. | 702/150 |
| 2007/0038155 A1* | 2/2007 | Kelly et al. | 600/595 |

* cited by examiner

*Primary Examiner* — Diane Mizrahi
(74) *Attorney, Agent, or Firm* — Neugeboren O'Dowd PC

(57) ABSTRACT

Methods and systems for applying power to a mobile device responsive to user actions are disclosed. An exemplary method includes detecting, while a mobile device is powered down, actions made by a user in connection with the user handling the mobile device without pressing a power button of the mobile device. A prediction is then made that the user is about to power up the mobile device based upon particular actions made by the user. And before the user presses the power button, power is applied to processing and network communication components of the mobile device so that if the user presses the power button, the processing and network communication components are already powered; thus reducing an amount of time it takes for the mobile device to access a network with the mobile device.

18 Claims, 5 Drawing Sheets

| Use Case | MS t1 | MS t2 | MS tN | LS t1 | LS t2 | LS tN | TS1 | TS2 | TSN | Predicted Use |
|---|---|---|---|---|---|---|---|---|---|---|
| 1 | High | No | No | High | High | Low | High | High | Low | Yes |
| 2 | Low | Low | High | Low | Low | High | High | High | High | Yes |
| N | Low | Low | High | Low | High | High | Low | High | High | Yes |

FIG. 5A $(c1)(MS)+(c2)(LS)+(c3)(TS1)+(c4)(TS2)+(c5)(TS3)+(cN)(TSN)=$ Predicted Use Value

FIG. 5B

MOBILE COMMUNICATION DEVICE WITH IMPROVED NETWORK CONNECTIVITY

FIELD OF THE INVENTION

The present invention relates to computing devices. In particular, but not by way of limitation, the present invention relates to power management of a mobile computing device.

BACKGROUND OF THE INVENTION

Mobile communication devices, such as smartphones, laptops, and tablet computers, are capable of accessing remote networks such as the Internet to obtain a variety of content that users are accustomed to receiving in connection with a variety of activities such as educational, gaming, financial, and utility applications. Increasingly, users are expecting faster delivery of content with these network-based activities.

When these mobile devices are uncoupled from an external energy source, however, they rely on internal energy sources (most typically batteries) that are often quickly exhausted—even when the devices are operating in a standby mode of operation. As a consequence, users often turn off these types of devices when they are not in use so the devices will have power remaining when the users desire to use the device again. But the time it takes to power a mobile device back up and connect to a network is often an annoyingly slow process for users that have grown accustomed to receiving data on demand. As a consequence, users often have an unpleasant experience when trying to limit power consumption on their mobile devices.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

Several aspects of the invention may include a communication device that includes a network communication component to receive data at the communication device, a data processor to process the data received at the communication device, and a use-prediction system. The use prediction system includes a plurality of sensors including touch sensors disposed about an exterior portion of a housing of the communication device to provide signals indicative of user actions while the network communication component and the data processor are powered down. The use prediction system also includes a data store that relates particular user actions to use data that indicates a likelihood that the user will power up the communication device and a sensor driver manager coupled to the plurality of sensors to receive the signals indicative of user actions and power up the network communication component and the data processor when the user actions match the particular user actions.

Aspects of the invention may also be characterized as a method for initiating an operation with a mobile device. The method includes detecting, while the mobile device is powered down, actions made by a user in connection with the user handling the mobile device without pressing a power button of the mobile device and predicting the user is about to power up the mobile device based upon particular actions made by the user indicating a likelihood that the user is going to power up the mobile device. And before the user presses the power button, power is applied to processing and network communication components of the mobile device so that if the user presses the power button, the processing and network communication components are already powered up thereby reducing an amount of time it takes for the mobile device to access a network with the mobile device when the mobile device is powered down.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

FIG. 5 depicts exemplary data that may be used to predict a user will power up the mobile devices depicted in FIGS. 1 and 2.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
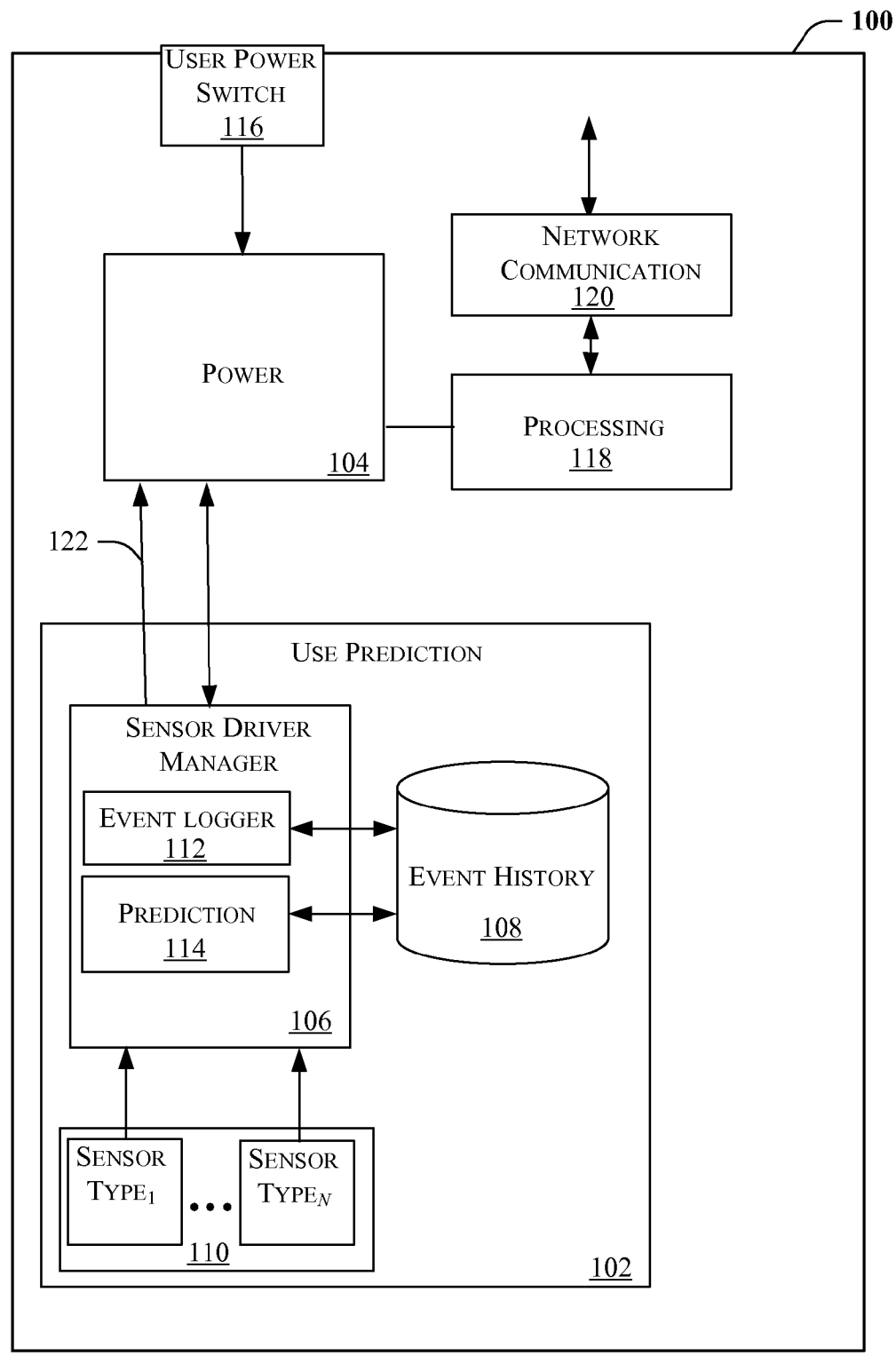
FIG. 1 illustrates a block diagram of a mobile communication device according to several embodiments of the present invention.

Referring first to FIG. 1, shown is a block diagram of a mobile communication device 100. As shown, the mobile communication device 100 includes a use prediction component 102 that is coupled to a power management component 104 of the mobile communication device 100. In addition, the use prediction component 102 includes a sensor driver manager 106 that is coupled to an event history data store 108 and N sensors 110. And the sensor driver manager 106 includes an event logger 112 and a prediction component 114. As depicted, the power management component 104 is coupled to a user power switch 116 and a processing component 118, which is coupled to a network communication component 120.

The illustrated arrangement of the components depicted in FIG. 1 is logical, the connections between the various components are exemplary only, and the depiction of this embodiment is not meant to be an actual hardware diagram; thus, the components can be combined or further separated in an actual implementation, and the components can be connected in a variety of ways without changing the basic operation of the system. For example, only a single network communication component 120 is depicted, but one of ordinary skill in the art will appreciate that the mobile communication device 100 may include several components (e.g., WiFi, cellular, USB, Ethernet, and Bluetooth components), that may be alternately used to provide network connectively.

The mobile communication device 100 may be realized by a wireless communications device such as a smartphone, PDA, netbook, tablet, laptop computer and other wireless devices. And the network communication component 120 generally operates to receive content via wireless communication links, but the network communication component 120 may work in tandem with wireline and wireless communication devices. In many implementations, the mobile communication device 100 includes components (not shown) utilized by the network communication component 120 that are associated with cellular communication to enable a user of the mobile communication device 100 to receive network data via remote networks, including the Internet, known cellular networks (e.g., CDMA, GPRS, LTE, and UMTS networks), and yet to be developed communication networks.

Although not depicted for simplicity, the mobile communication device 100 may include a variety of applications that access one or more remote networks, via the network communication component 120, to perform or assist the performance of specific operations. For example, the mobile communication device 100 may include an Internet browser and any of a variety of apps that access remote networks in connection with presenting content to a user of the mobile communication device 100.

The power management component 104 in this embodiment generally represents components of the mobile communication device 100 that provide a supply of energy and regulate the application of power to the processing component 118 and the network communication component 120 among other components of the mobile communication device 100. For example, the power management component 104 may include a battery, components to charge the battery, and components to initiate and regulate the application of power to the processing component 118 and the network communication component 120 responsive to either a signal from the user power switch 116 or a signal from the use prediction component 102.

In general, the use prediction component 102 operates, while the processing component 118 and network communication component 120 are powered down, to predict whether a user is about to power up the mobile communication device 100 (e.g., by activating the user power switch 116) and prompt the power management component 104 to power up the processing component 118 and network communication component 120 so that the processing component 118 and the network communication component 120 are already powered up when the user activates the user power switch 116. As a consequence, when the user activates the user power switch 116 the mobile communication device 100 is able to much more quickly access content from remote networks; thus improving the user experience.

As shown, the sensor driver manager 106 in this embodiment communicates a signal to the power management component 104 that prompts the power management component 104 to apply power to the processing component 118 and the network communication component 120 when it is likely that the user is about to power up the mobile communication device 100 (e.g., to use an application that utilizes the network communication component 120 to obtain network data).

As depicted, the sensor drive manager 106 includes a prediction component 114 that generally operates to receive inputs from the N sensor types that are indicative of actions of the user, and compares the user actions with use data in the event history 108 that relates particular user actions to an indication of a likelihood that the user will power up the mobile communication device 100. And when the user actions indicate (on the basis of the data in the event history 108) that the user is about to power up the mobile communication device 100, the prediction component 114 initiates the power-up signal 122 from the use prediction component 102 to the power management component 104. And the event history 108 may be realized by a variety of non-transient memory storage components including non-volatile memory.

In addition, the sensor driver manager 106 includes an event logger component 112 that operates to update the data in the event history 108 so that the event history 108 is updated to more accurately predict the user's actions. For example, if a particular collection of the N sensors provides signals that the event history 108 indicates are likely to lead to a user powering up the mobile communication device 100 (so the use prediction component 102 does prompt the power management component 104 to power up the processing component 118 and the network communication component 120), but the user actually does not power up the mobile communication device 100, then factors that weight the particular collection of the N sensors may be lowered so that as a whole, the data in the event history 108 provides a lower value that indicates the particular collection of the N sensors is less likely (than previously predicted) to result in the user powering up the mobile device 100.

Similarly, if the user does actually power up the mobile device 100 (by actuating the user power switch 116) after the prediction component 114 prompts the power management component 104 to power up the processing component 118 and the network communication component 120, then the weighting factors that are applied to the particular collection of N sensors may be increased.

Each of the N sensors may be realized by a variety (and varying quantity) of sensor types including touch sensors, motion sensors (e.g., an accelerometer), and tilt sensors, and collectively, the N sensors may be implemented with any combination and quantity of sensor types. In several embodiments one or more of the N sensor types are disposed at, or near, the surface of a housing of the mobile communication device 100 where users hold the mobile communication device 100 to carry it around. For example, in many implementations the N sensor types include several touch sensors that are disposed at a surface of the housing of the mobile communication device so that whenever the user touches the mobile communication device 100 on the locations where the touch sensors are positioned (e.g., with an intention to carry around and power up the mobile communication device 100), the sensor driver manager 106 may prompt the power management component 104 to power up the processing component 118 and the network communication component 120.

To further enhance the accuracy of the prediction component 114 (e.g., to improve the prediction accuracy rate and reduce false positives), the N sensor types may include motion sensors and/or tilt sensors in addition to the touch sensors. For example, when particular ones of touch sensors are activated by a user holding the mobile communication device 100 followed shortly in time by a tilt sensor indicating that the mobile communication device 100 has been tilted in a manner consistent with the user viewing the mobile communication device 100, a prediction that the user is about to power up the mobile communication device 100 is stronger than if touch sensors alone are utilized.

Figure 2:
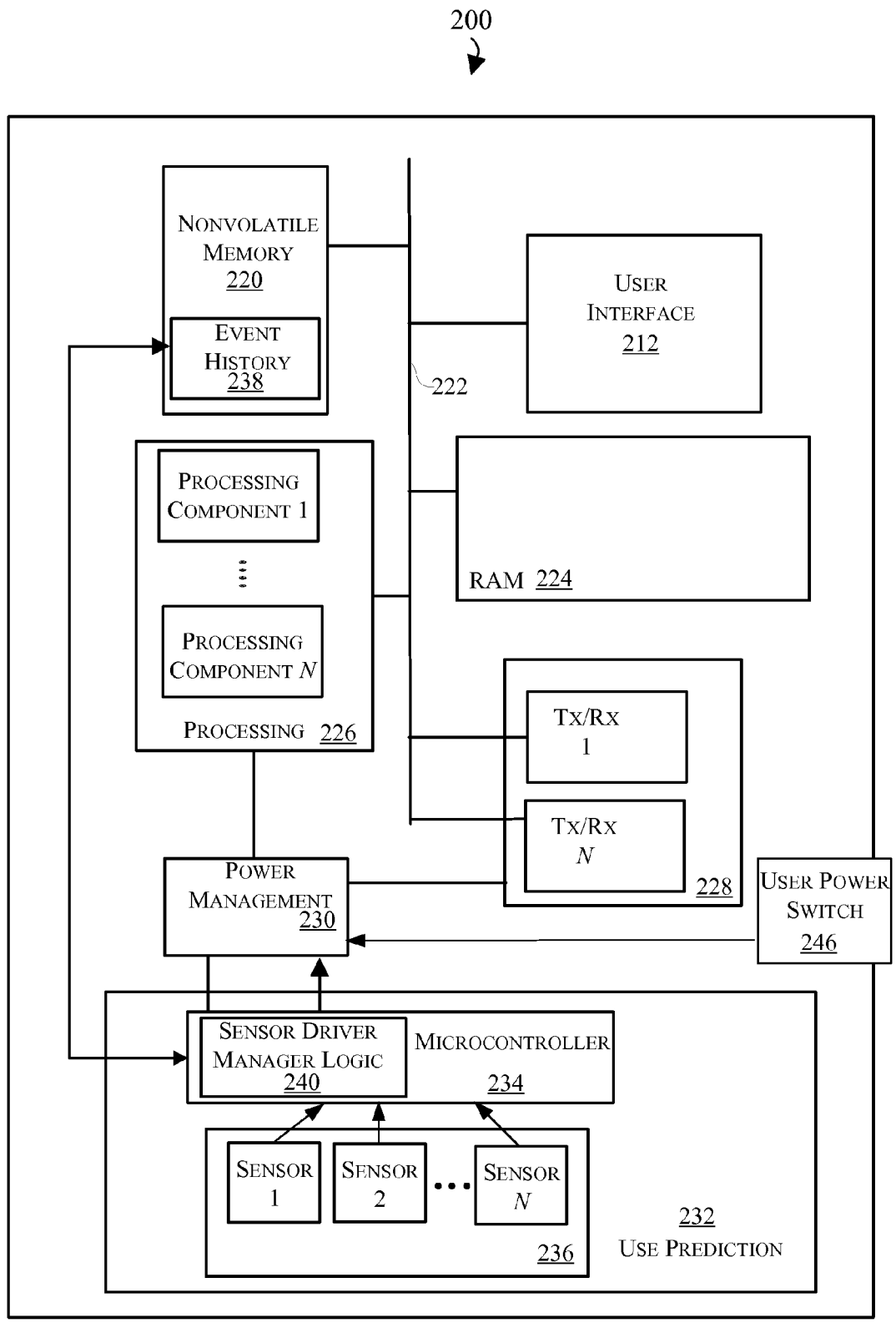
FIG. 2 is a block diagram depicting exemplary physical components of the mobile communication device depicted in FIG. 1.

Referring next to FIG. 2, shown is a block diagram depicting physical components of an exemplary mobile communication device 200 that may be utilized to realize the mobile communication device 100 described with reference to FIG.

1. As shown, the communication device 200 in this embodiment includes a user interface 212, and nonvolatile memory 220 that are coupled to a bus 222 that is also coupled to random access memory ("RAM") 224, N processing components 226, and a transceiver component 228 that includes N transceivers. In addition, a power management component 230 is coupled to the processing components 226, the transceiver component 228, and a use prediction component 232.

The use prediction component 232 in this embodiment includes a microcontroller 234 that is coupled to N sensors 236 and an event history 238 portion of the nonvolatile memory 220. As shown, sensor driver manager control logic 240 runs on the micro controller 234.

Although the components depicted in FIG. 2 represent physical components, FIG. 2 is not intended to be a hardware diagram; thus many of the components depicted in FIG. 2 may be realized by common constructs or distributed among additional physical components. Moreover, it is certainly contemplated that other existing and yet-to-be developed physical components and architectures may be utilized to implement the functional components described with reference to FIG. 2.

The user interface 212 generally represents one or more components that operate to enable a user to operate the mobile communication device 200 and to receive information from the mobile communication device 200. For example, the user interface 212 may include a display that provides a presentation of content to a user and may include a separate keypad that functions as an input device for the user. Alternatively, the user interface 212 may include a touchscreen that may be realized by any of a variety of touchscreen displays (e.g., LCD and OLED displays). One of ordinary skill in the art will appreciate that the user interface 212 may include other devices such as pointing devices (e.g., a mouse) that enable a user to interact with the mobile communication device 200.

The nonvolatile memory 220 generally functions to store (e.g., persistently store) data and executable code including code that is associated with the functional components depicted in FIG. 1. In some embodiments for example, the nonvolatile memory 220 includes bootloader code, modem software, operating system code, file system code, and code to facilitate the implementation of other components well known to those of ordinary skill in the art that are not depicted nor described in connection with FIG. 1 for simplicity. In addition, in this embodiment the nonvolatile memory 220 includes event history 238, which is utilized by the microcontroller 234 of the use prediction component 232 in connection with predicting whether the user is going to power up the mobile communication device as discussed further herein below. In a variation of the embodiment depicted in FIG. 2, the sensor driver logic 240 may also be stored in the nonvolatile memory 220 and executed from nonvolatile memory 220 or RAM 224 by the microcontroller 234 or another processor.

In many implementations, the nonvolatile memory 220 is realized by flash memory (e.g., NAND or ONENAND memory), but it is certainly contemplated that other memory types may be utilized as well. Although it may be possible to execute the code from the nonvolatile memory 220, the executable code in the nonvolatile memory 220 is typically loaded into RAM 224 and executed by one or more of the N processing components 226.

The N processing components 226 in connection with RAM 224 generally operate to execute the instructions stored in nonvolatile memory 220 to effectuate many of the functional components of the mobile communication device 200, and one or more of the N processing components may be used to realize the processing component 118 described in connection with FIG. 1. For example, one or more apps or a web browser may reside in RAM 224 when executed and may be executed by one or more of the N processing components 226. As one of ordinarily skill in the art will appreciate, the N processing components 226 may include a video processor, modem processor, DSP, graphics processing unit (GPU), and other processing components.

The transceiver component 228 includes N transceiver chains, which may be used for communicating with one or more networks to realize portions of the network communication component 120 described with reference to FIG. 1. Each of the N transceiver chains may represent a transceiver associated with a particular communication scheme. For example, each transceiver may correspond to protocols (both wire-based and wireless) that are specific to local area networks, cellular networks (e.g., a CDMA network, a GPRS network, a UMTS networks), and other types of communication networks.

The use prediction portion 232 in this embodiment utilizes a programmable microcontroller 234 that is connected to the outputs of the N sensors 236 and the event history 238 to predict when a user is about to power up the mobile communication device 200. More specifically, the microcontroller 234 in this embodiment operates while the processing component 226 and the transceiver component 228 are powered down, to monitor signals from the N sensors, and responsive to a collection of signals that indicates the user is about to power up the mobile device 200, the microcontroller 234 prompts the power management component 230 to raise a power pin of one or more of the N processors to initiate a wake up sequence of the mobile communication device 200 that includes powering up the transceiver component 228 so that one or more of the N processors and the transceiver component 228 are already powered up when the user actuates the user power switch 246.

The microcontroller 234 in this embodiment utilizes relatively little power so that it may continue to operate while the processing component 226 and the transceiver component 228 are powered down. And although not required, the microcontroller 234 may utilize a separate power source (e.g., separate battery or fuel cell) than the power management component 230 utilizes to power the processing component 230, the transceiver component 228, or the user interface 212. But in many implementations the microcontroller 234 utilizes power that is derived from the same source (e.g., battery or fuel cell) that is used to power the other components of the mobile communication device 200.

Figure 3:
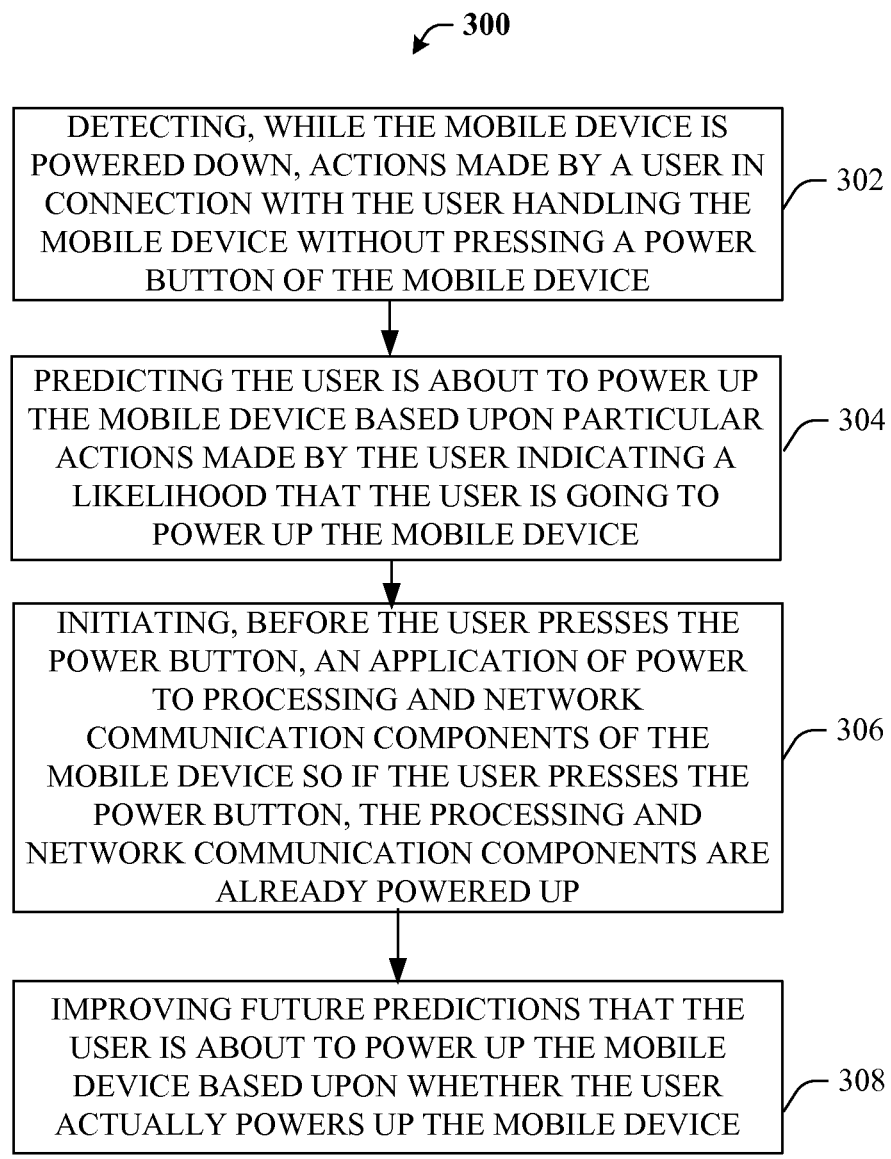
FIG. 3 is a flowchart depicting operations that may be carried out in connection with the mobile communication devices depicted in FIGS. 1 and 2.

While referring to FIGS. 1 and 2 simultaneous references are made to FIG. 3, which is a flowchart depicting an exemplary method that may be traversed by the mobile communication device 100 depicted in FIG. 1 or the mobile communication device 200 depicted in FIG. 2. As shown, while the mobile communication device 100, 200 is powered down, actions made by a user in connection with the user handling the mobile device, without pressing a power button of the mobile device, are detected (Block 302).

As discussed above, actions of the user are detected by one or more sensors 110, 236, which may include a variety of disparate types of sensors. In an exemplary embodiment, the sensors 110, 236 include several touch sensors that are disposed at or near the surface of the mobile communication device 100, 200 to detect when, and where, the user is touching the mobile communication device 100, 200.

Figure 4A:
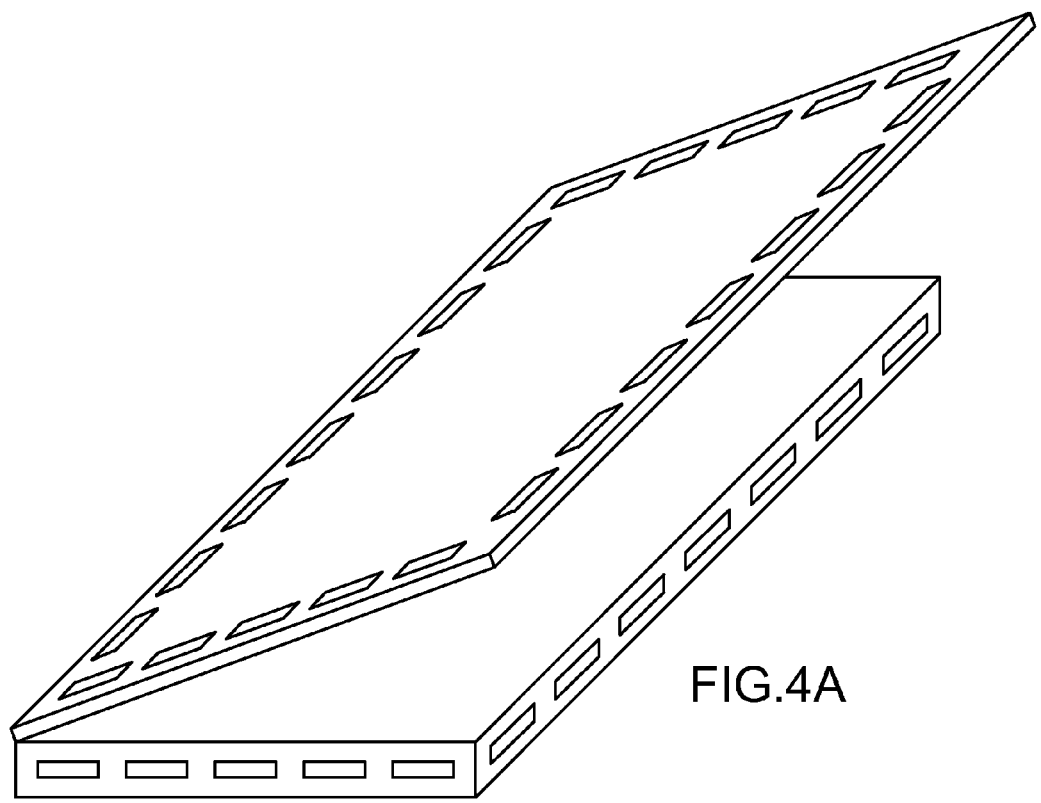
FIGS. 4A and 4B are diagrams depicting exemplary placement of touch sensors on a netbook and smart phone, respectively.
Figure 4B:
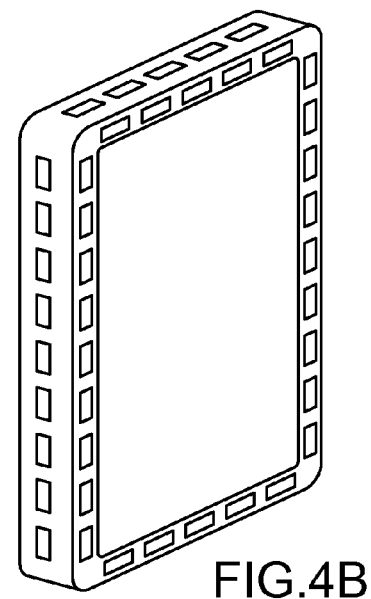

Referring to FIGS. 4A and 4B for example, shown are exemplary mobile communication devices that include touch sensors that are disposed about locations of surfaces of the mobile communication devices. More specifically, FIG. 4A depicts touch sensors disposed about edges of a housing of a netbook computer, and FIG. 4B depicts touch sensors disposed about edges of a housing of a smart phone. The depicted locations and quantities of the touch sensors in FIGS. 4A and 4B is merely exemplary, and it is certainly contemplated that the placement and density of the touch sensors may vary depending upon the type of mobile communication device and empirical data that indicates where users are most likely to touch the mobile communication device.

Although touch sensors are an important aspect of many embodiments, it is contemplated that other types of sensors may be utilized to provide a better understanding of the actions that the user is carrying out so that a better prediction may be made about whether the user is about to operate the mobile communication device. For example, outputs from particular ones of the touch sensors in close connection with output signals from a motion sensor and tilt sensor may be utilized to obtain an improved representation of the user's actions. It is also contemplated that a touchscreen may also be utilized in connection with other sensors to sense actions of the user.

Referring again to FIG. 3, a prediction is then made that the user is about to power up the mobile communication device 100, 200 based upon particular actions made by the user indicating a likelihood that the user is going to power up the mobile device (Block 304). As discussed with reference to FIGS. 1 and 2, an event history 108, 238 is utilized to relate particular user actions to a value that indicates likelihood that the user will power up the mobile communication device 100, 200.

In some embodiments, the event history 108 includes data sets that are used in connection with the sensor 110, 236 outputs to predict whether the user's actions will lead to the user powering up the mobile communication device 100, 200. Each data set, for example, may be associated with a use case that may be characterized in terms of sensor outputs that correspond to user actions. More specifically, each data set may include a plurality of parameters that are each associated with a corresponding one of the sensors.

As shown in FIG. 5A for example, a table may be stored in the event history 108, 238 and used to provide a prediction based upon a status of a plurality of sensors. As shown in FIG. 5A, the outputs of sensors are presented as binary values (e.g., high or low) and the combinations of the values that are likely to result in the user powering up the mobile communication device 100, 200 are organized as use case data sets that are depicted as rows in the exemplary table. In this example, the status of a motion sensor (MS) at N times (t1, t2, tN) is provided along with the status of a tilt or level sensor (LS) at three times (t1, t2, tN). In addition, the statuses of N touch sensors (TS) are also utilized in the exemplary table. In operation, the status of the collection of sensors is compared with the table, and if the combination of all the sensor outputs match a particular use case data set, then a prediction is made that the user will power up the mobile communication device 100, 200. It should be recognized that FIG. 5A is merely one exemplary tabular approach to using stored values to predict whether a user is going to power up a mobile communication device 100, 200, and that other data formats are certainly contemplated.

In an alternative embodiment, each sensor's output may be associated with a value that is weighted by a corresponding coefficient, and the sum of the weighted sensor values may be used to predict whether the user is about to power up the mobile communication device 100, 200. As shown in FIG. 5B, for example, coefficients (c1, c2, c3 . . . cN) are used as weighting factors to weight each of a corresponding one of a plurality of sensor output values, and the sum of the weighted values are used to provide a predicted use value. In operation, the sensor outputs are converted to values (e.g., by techniques well known to those of ordinary skill in the art) that are weighted by the coefficients and summed together, and if the predicted use value exceeds a threshold, then the likelihood that the user will power up the mobile communication device is high enough that one or more components (e.g., processing and communication components) are powered up to ready the mobile communication device 100, 200 for use. It should be recognized that FIG. 5B is merely one exemplary algorithmic-type approach to predict whether a user is going to power up a mobile communication device 100, 200, and that other calculation approaches are certainly contemplated.

When a prediction is made that the user is going to power up the mobile communication device 100, 200, before the user presses the power button, power is applied to processing and network communication components of the mobile communication device 100, 200 so that if the user presses the power button, the processing and network communication components are already powered up—thereby reducing an amount of time it takes for the mobile communication device to access a network with the mobile communication device when the mobile communication device is initially powered down (Block 306).

Although the particular components of the mobile communication device 100, 200 that are powered up based upon the prediction may vary, Applicant has found that users often desire to utilize applications (e.g., a browser or other app) that require processing and network-related components that typically take a relatively long time to power up and become connected to remote network resources. As a consequence, to enhance the user experience, in many embodiments, the processing and network communication components that are associated with accessing and processing network data are powered up when it appears as though the user intends to access the network resources.

And based upon whether the user actually powers up the mobile communication device 100, 200, future predictions that the user is about to power up the mobile communication device 100, 200 are improved (Block 308). For example, when the sensor driver manager 106 or microcontroller 234 prompts power to be applied to processing components 118, 226, the values or statuses of the sensor outputs are retained (e.g., in the non-volatile memory 220), and if the user actually does press the user power switch 116, 246, then the inputs from the sensors are validated.

For example, in the table depicted in FIG. 5A, the predicted use may be a multi-value-variable (instead of a binary yes/no variable) that is adjusted so that if the combination of sensor values is validated, the predicted value may be adjusted higher. Similarly, if a calculation, such as the calculation depicted in FIG. 5B is utilized, each of the particular coefficients may be incrementally increased when the user actually actuates the user power switch 116, 246.

On the other hand, if a prediction is made that the user is about to power up the mobile communication device 100, 200, and the user actually does not power up the mobile communication device 100, 200, then the use data in the event history 108, 238 is updated to reflect that the collection of sensor outputs that triggered the processing and network components to be powered up, is actually less likely to result in the user actuating the user power switch 116, 246.

For example, in the table depicted in FIG. 5A, the predicted use may be a variable that is adjusted so that if the combination of sensor values is not validated, the predicted value may be adjusted lower. Similarly, if a calculation, such as the calculation depicted in FIG. 5B is utilized, each of the particular coefficients may be incrementally decreased if the user does not actually actuate the user power switch 116, 246.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for initiating an operation with a mobile device, the method comprising:
   detecting, while the mobile device is powered down, actions made by a user in connection with the user handling the mobile device without pressing a power button of the mobile device;
   predicting the user is about to power up the mobile device based upon the actions made by the user indicating a likelihood that the user is going to power up the mobile device; and
   initiating, before the user presses the power button, an application of power to processing and network communication components of the mobile device so that when the user presses the power button, the processing and network communication components are already powered up thereby reducing an amount of time that the mobile device takes to access a network with the mobile device when the mobile device is powered down.

2. The method of claim 1, wherein detecting includes detecting actions made by the user with a plurality of disparate sensors, and predicting includes accessing an event history data store and comparing the actions made by the user with a value that is associated with actions in the event history data store, the value indicating a likelihood, based upon previous actions of the user, that the user is about to power up the mobile device.

3. The method of claim 2, including:
   updating the event data store based upon whether the user actually pressed the power button after predicting the user is about to power up the mobile device thereby improving predictions that the user is about to power up the mobile device.

4. The method of claim 3, wherein weighting factors are associated with each of the plurality of disparate sensors and the weighting factors are stored in the non-volatile memory.

5. The method of claim 2, wherein the plurality of disparate sensors are selected from the group consisting of touch sensors, motion sensors, and tilt sensors.

6. The method of 1, wherein detecting includes detecting the actions made by the user with touch sensors disposed about an exterior portion of a housing of the mobile device.

7. A mobile device comprising:
   hardware means for detecting, while the mobile device is powered down, actions made by a user in connection with the user handling the mobile device without pressing a power button of the mobile device;
   means for predicting the user is about to power up the mobile device based upon the actions made by the user indicating a likelihood that the user is going to power up the mobile device; and
   means for initiating, before the user presses the power button, an application of power to processing and network communication components of the mobile device so that when the user presses the power button, the processing and network communication components are already powered up thereby reducing an amount of time that the mobile device takes to access a network with the mobile device when the mobile device is powered down.

8. The mobile device of claim 7, wherein the means for detecting includes means for detecting actions made by the user with a plurality of disparate sensors, and the means for predicting includes means for accessing an event history data store and comparing actions made by the user with a value that is associated with the actions in the event history data store, the value indicating a likelihood, based upon previous actions of the user, that the user is about to power up the mobile device.

9. The mobile device of claim 8, including:
   means for updating the event data store based upon whether the user actually pressed the power button after predicting the user is about to power up the mobile device thereby improving predictions that the user is about to power up the mobile device.

10. The mobile device of claim 9, wherein weighting factors are associated with each of the plurality of disparate sensors and the weighting factors are stored in the non-volatile memory.

11. The mobile device of claim 8, wherein the plurality of disparate sensors are selected from the group consisting of touch sensors, motion sensors, and tilt sensors.

12. The mobile device of claim 7, wherein means for detecting includes means for detecting the actions made by the user with touch sensors disposed about an exterior portion of a housing of the mobile device.

13. A non-transitory, tangible processing readable storage medium, encoded with processor readable instructions to perform a method for initiating an operation with a mobile device, the method comprising:
   detecting, while the mobile device is powered down, actions made by a user in connection with the user handling the mobile device without pressing a power button of the mobile device;
   predicting the user is about to power up the mobile device based upon the actions made by the user indicating a likelihood that the user is going to power up the mobile device; and
   initiating, before the user presses the power button, an application of power to processing and network communication components of the mobile device so that when the user presses the power button, the processing and network communication components are already powered up thereby reducing an amount of time that the mobile device takes to access a network with the mobile device when the mobile device is powered down.

14. The non-transitory, tangible processing readable storage medium of claim 13, wherein detecting includes detecting actions made by the user with a plurality of disparate sensors, and predicting includes accessing an event history data store and comparing actions made by the user with a value that is associated with the actions in the event history data store, the value indicating a likelihood, based upon previous actions of the user, that the user is about to power up the mobile device.

15. The non-transitory, tangible processing readable storage medium of claim 14, including:

updating the event data store based upon whether the user actually pressed the power button after predicting the user is about to power up the mobile device thereby improving predictions that the user is about to power up the mobile device.

16. The non-transitory, tangible processing readable storage medium of claim 15, wherein weighting factors are associated with each of the plurality of disparate sensors and the weighting factors are stored in the non-volatile memory.

17. The non-transitory, tangible processing readable storage medium of claim 14, wherein the plurality of disparate sensors are selected from the group consisting of touch sensors, motion sensors, and tilt sensors.

18. The non-transitory, tangible processing readable storage medium of 13, wherein detecting includes detecting the actions made by the user with touch sensors disposed about an exterior portion of a housing of the mobile device.

* * * * *